United States Patent [19]

Yamaji et al.

[11] Patent Number: 4,781,075

[45] Date of Patent: Nov. 1, 1988

[54] CAMSHAFT AND METHOD OF MAKING THE SAME

[75] Inventors: Masaaki Yamaji, Misato; Shunsuke Takeguchi, Yono, both of Japan

[73] Assignee: Nippon Piston Ring Co., Ltd., Tokyo, Japan

[21] Appl. No.: 8,072

[22] Filed: Jan. 27, 1987

Related U.S. Application Data

[63] Continuation of Ser. No. 721,900, filed as PCT JP84/00123 on Mar. 23, 1984, published as WO85/00863 on Feb. 28, 1985.

[30] Foreign Application Priority Data

Aug. 3, 1983 [JP] Japan .............................. 58-140966

[51] Int. Cl.⁴ ............................................. F16H 53/02
[52] U.S. Cl. ................................................... 74/567
[58] Field of Search .......................... 74/567; 419/6, 8

[56] References Cited

U.S. PATENT DOCUMENTS

| | | | |
|---|---|---|---|
| 3,447,395 | 6/1969 | Latour | 74/567 |
| 4,389,462 | 6/1983 | Walsh | 419/8 X |
| 4,438,555 | 7/1984 | Tsumuki | 74/562 X |
| 4,575,913 | 3/1986 | Sugiuchi | 74/562 X |

*Primary Examiner*—John Rivell
*Attorney, Agent, or Firm*—Birch, Stewart, Kolasch & Birch

[57] ABSTRACT

A camshaft in which the outer peripheral surface of a shaft (13) is provided with an axial groove (14), and a fitting member (10) is connected to the shaft (13) by liquid-phase sintering under the state in which a projection (12) on the surface of a bore (11) in the fitting member (10) is fitted into the groove (14). The projection (12) in the bore (11) of the fitting member (10) is formed so that its cross-sectional configuration is smaller than that of the groove (14) in the shaft (13). Therefore there is no possibility that the fitting member (10) made of a green compact can be damaged during the fitting or sintering.

5 Claims, 2 Drawing Sheets

CAMSHAFT AND METHOD OF MAKING THE SAME

This application is a continuation of application Ser. No. 721,900 filed as PCT JP84/00123 on Mar. 23, 1984, published as WO85/00863 on Feb. 28, 1985, abandoned.

TECHNICAL FIELD

The present invention relates to an assembled camshaft and a method of making the same, the camshaft being composed of a solid or tubular steel shaft and a plurality of separately fabricated fitting members, such as cam lobes and journals, made of a sintered alloy and integrally joined with the shaft.

BACKGROUND ART fitting members, such as cam lobes and the like, have been assembled on a steel shaft by press-fitting. However, press-fitting is ineffective for fitting members made of sintered alloy. The reason for this is that the hard pre-sintered member easily damages the shaft when forced on the shaft and also the soft green member readily collapses when forced on the shaft. On the other hand, clearance-fitting is shown in JP A No. 54-41266 in which, though the fitting member is loosely fitted on the shaft, it has the projection thereof tightly fitted in the groove in the shaft, because the projection is slightly larger in cross-section than the groove.

The method allows the pre-sintered fitting member to loosely fit on the shaft without damaging the shaft and be fixedly positioned through a fitting engagement between the projection and the groove. However, this method has some disadvantages, one of which is that the fitting member, while sintered at a liquid-phase yielding temperature, sometimes tears from the projection which is tightly retained in the the groove. Another disadvantage of this method is that it is still unavailable for use with the green fitting member, because the projection will break when press-fitted in the groove. Still another disadvantage is that the tight engagement between the projection and the groove sometimes prevents a fully circumferential contact between the bore of the fitting member and the outer periphery of the shaft, thereby failing to achieve a firm connection therebetween.

The present invention is intended to resolve the disadvantages as described above. It will be understood that among the objects of the present invention are: to provide a camshaft in which the projection of the fitting member is prevented from being broken while it is sintered at a liquid-phase yielding temperature, and to provide a camshaft in which the fitting member is fabricated from sinterable alloy powders and fitted on the shaft without being broken. The present invention also provides a camshaft in which the fitting member has a bore thereof which is fully circumferentially bonded to the outer periphery of the shaft except the projection and the groove.

DISCLOSURE OF THE INVENTION

In accordance with the present invention, a camshaft comprises a solid and tubular steel shaft and a plurality of fitting members made of sinterable alloy powders, the fitting member having a bore thereof provided with a projection slightly smaller, in cross-sectiin, than an axial groove formed in the outer periphery of the shaft. The fitting member is loosely coupled with the shaft and peripherally positioned through a fitting engagement between the projection and the groove. Thereafter, the assembly of the fitting members and the shaft is sintered at a liquid-phase yielding temperature. Preferably, the clearance between the projection and the groove is slightly larger than that between the inner periphery of the bore and the outer periphery of the shaft.

The method of the present invention comprises the steps of forming a solid or tubular shaft of steel and a plurality of fitting members loosely coupled with the shaft, and providing at least an axial groove on the outer periphery of the shaft shaping. A projection is shaped on the inner periphery of the bore of each fitting member in a manner such that the projection is slightly smaller, in cross-section, than the groove assembling. The fitting member is assembled with the shaft through the fitting engagement between the projection and the groove, and the assembly is sintered at a liquid-phase yielding temperature.

The advantages offered by the present invention are that the hard pre-sintered fitting member is loosely fitted on the shaft without damaging the shaft; peripheral positioning is achieved through a fitting engagement between the projection in the bore of the fitting member and the groove in the outer periphery of the shaft before sintering; and the projection is prevented from cracking when being sintered because of it is loosely fitted in the groove. Another advantage is that even a green fitting member has its projection fitted in the groove on the outer periphery of the shaft without collapsing when loosely fitted on the shaft.

BRIEF DESCRIPTION OF DRAWINGS

The present invention will become more fully understood from the detailed description given hereinbelow and the accompanying drawings which are given by way of illustration only, and thus are not limitative of the present invention, and wherein.

THE BEST MODE OF CARRYING OUT THE INVENTION

The present invention described in detail below with reference to drawings which illustrate some preferred embodiments.

Figures 1, 2:
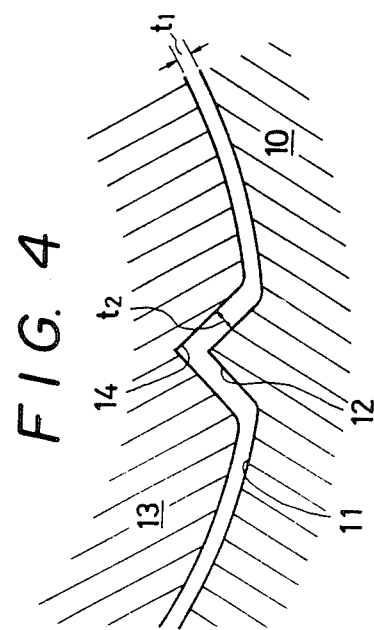
FIG. 1 is an elevation of the cam lobe of the present invention.
FIG. 2 is an elevation of the shaft of the present invention.

As seen in FIG. 1, the cam lobe 10 has the inner surface of the bore 11 formed with a V-shaped projection 12. As seen in FIG. 2, the shaft 13 of steel has the outer periphery thereof formed with four V-shaped grooves 14. The cam lobe 10 of sintered metal is loosely mounted on the shaft 13 of steel, while the projection 12 is also loosely fitted in one of the grooves 14 to define the peripheral position of the cam lobe 10. The journal 15 of steel is mounted on and bonded to the shaft 13 by welding.

Figure 4:
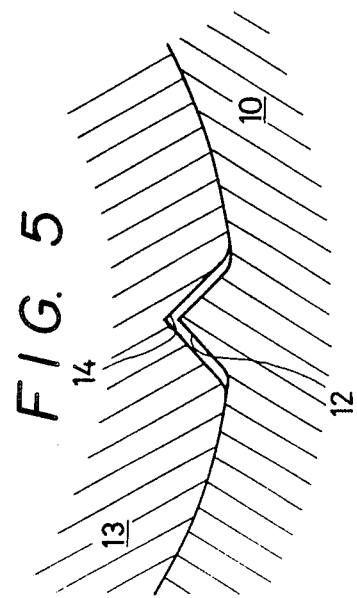
FIG. 4 is an enlarged section of the cam lobe fitted on the shaft before sintered.
Figure 3:
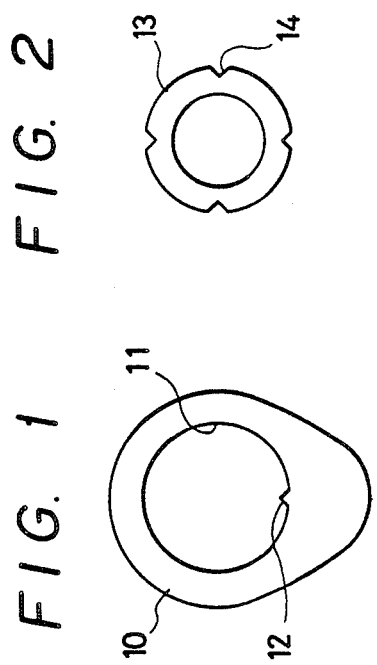
FIG. 3 is a perspective view of the relevant portion of the assembled camshaft.

As seen in FIG. 4, the projection 12 of the cam lobe 10 is slightly smaller, in cross-section, than the groove 14 of the shaft 13 with the result that there remain not only a radial clearance t1 between the bore 11 and the shaft 13 but also another clearance t2 between the projection 12 and the groove 14 when the cam lobe 10 is coupled with the shaft.

When the cam lobe 10 is coupled with the shaft 13, the clearances t1 and t2 allow an easy fitting of the cam lobe 10 on the shaft 13 as well as a smooth insertion of the projection 12 into the groove 14 and prohibits stress-concentration in any fitting portion between the cam lobe 10 and the shaft 13. Thus, the cam lobe, even if is green, can be assembled on the shaft without having the projection broken.

Figure 5:
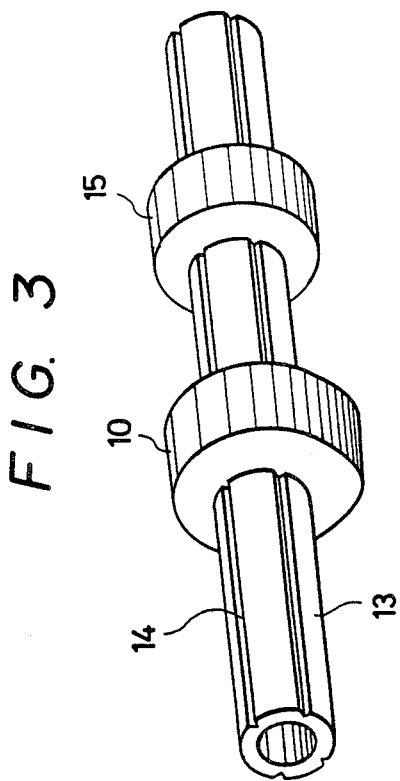
FIG. 5 is a view similar to FIG. 4, showing the cam lobe after sintered.

Thereafter, the assembly is sintered at a liquid-phase yielding temperature in which the cam lobe shrinks to have the inner periphery thereof metallurgically bonded to the outer periphery of the shaft, resulting in a very high bonding strength. As seen in FIG. 5, when the cam lobe 10 is contracted by the liquid-phase sintering, the projection 12 is completely received within the groove 14, so that the fitting between the projection 12 and the groove 14 provides no obstacle to a fully circumferential contact between the inner surface of the bore 11 and the outer surface of the shaft 13 except for the projection 12 and the groove 14. On the other hand, the projection 12 is prevented from cracking because of being loosely fitted in the groove and being free from stress-concentration.

Figure 6:
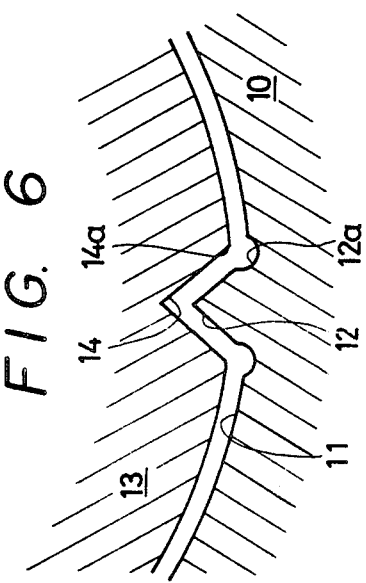
FIG. 6 is a view similar to FIG. 4, showing another embodiment before sintered.

In the embodiment shown in FIG. 6, the cam lobe 10 has the projection 12 formed with a pair of undercuts 12a which are situated at the opposite edges 14a of the groove 14 of the shaft 13. The undercut 12a prevents the root of the projection 12 from tightly fitting in the groove 14, so that the cam lobe 10 shrinks to provide the inner periphery of the bore 11 in full contact with the outer periphery of the shaft 13 when sintered at the liquid-phase yielding temperature. Furthermore, the undercuts allow the projection 12 to be loosely fitted in the groove 14 even when the bore 11 shrinks by liquid-phase sintering, so that the projection 12 is free from being broken due to stress concentration. Furthermore, the undercuts 12a permit a clearance between the projection 12 and the groove 14 to be the same as that between the bore 11 and the shaft 13, so that the cam lobe 10 is more easily positioned when it is mounted on the shaft.

Figure 8:
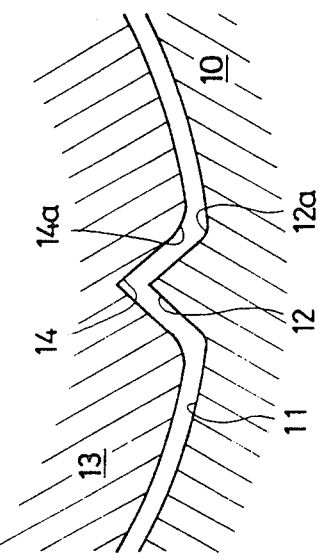
FIG. 8 is a view similar to FIG. 4, showing a further embodiment before sintered.
Figure 7:
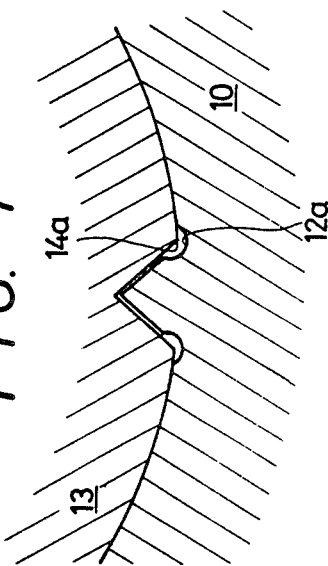
FIG. 7 is a view similar to FIG. 5, showing the embodiment of FIG. 6 after sintered.
Figure 9:
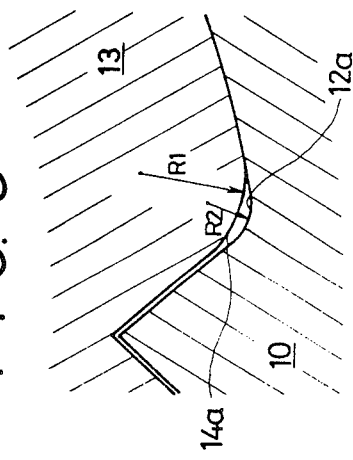
FIG. 9 is a view similar to FIG. 5, showing the embodiment of FIG. 8 after sintered.

In the embodiment of FIG. 8, the shaft 13 has the groove 14 provided with the round edges 14a of which the radius of curvature R1 is larger than the radius of curvature R2 of the root corner 12a of the projection 12. The large curvature of the round edge 14a allows the projection 12 to be smoothly fitted in the groove 14 when the cam lobe 10 is mounted on the shaft. As seen in FIG. 9, the round edge 14a permits the root of the projection 12 to be completely received within the groove 14 without wedging itself in the groove 14, so that the projection 12 is protected against rupture due to stress concentration. The round edge 14a also allows the inner periphery of the bore 11 to fully contact the outer periphery of the shaft 13 when the cam lobe 10 is sintered by a liquid-phase sintering. This means that the bonding strength between the shaft 13 and the cam lobe 10 is very high. The round edge 14a allows the clearance between the projection 12 and the groove 14 to be the same as that between the shaft 13 and the bore 11 of the cam lobe 10 so that the cam lobe is easily positioned when it is mounted on the shaft.

From the foregoing, it is understood that the other fitting members, such as journals and gears, can be made of sintered alloy, and assembled on the steel shaft in the same way as demonstrated in the preferred embodiments. It is also understood that the projection in the bore and the groove in the shaft are not limited to be similarly shaped nor to be V-shaped. For example, a semi-circular groove and a V-shaped projection can be coupled with each other.

We claim:

1. A camshaft comprising a steel shaft having at least one axial groove formed in the outer periphery thereof and a plurality of sintered alloy fitting members formed with a bore and loosely fitted on said shaft before being sintered, said bore containing at least one projection, said fitting member being mounted in position on said shaft through a fitting engagement between said projection and said groove and bonded to said shaft by liquid-phase sintering, wherein said projection is smaller, in cross-section, than said groove, and the clearance between said projection and said groove is larger than the clearance between said bore and said shaft before the fitting member is sintered while the clearance between the shaft and the bore is smaller than the radial sintering shrinkage of the bore, the inner periphery of said bore and the outer periphery of said shaft being metallurgically bonded to each other except at said projection and said groove, which are radially separated from each other after being sintered.

2. The sintered camshaft of claim 1 wherein the inner periphery of the fitting member is bonded to the outer periphery of the shaft, thereby defining a space existing between the groove and the projection.

3. The sintered camshaft of claim 2 wherein an undercut portion is provided where the projection of the fitting member meets the inner periphery of the bore of the fitting member.

4. The sintered camshaft of claim 1 wherein a rounded-off portion is provided at the point where the projection of the fitting member meets the inner periphery of the bore of the fitting member, said rounded-off portion having a larger radius of curvature than that where the outer periphery of the shaft meets the axial groove; thereby providing an enlarged space therebetween after sintering.

5. A method of manufacturing a camshaft comprising the steps of
- providing a steel shaft and a plurality of fitting members containing axial bores,
- shaping at least one axial groove in the outer periphery of the steel shaft,
- shaping at least one projection on the inner periphery of the bore of the fitting member, said projection being shaped to be smaller in cross-section than said groove and to have a clearance therebetween larger than the clearance between the outer periphery of said shaft and the inner periphery of the bore in said fitting member, while the clearance between the shaft and the bore is smaller than the radial sintering shrinkage of the bore,
- bonding said fitting members to said shaft by liquid-phase sintering in a manner such that the inner periphery of said bore and the outer periphery of said shaft are in full contact with each other except at said projection and said groove, which are radially separated from each other after said sintering.

* * * * *

UNITED STATES PATENT AND TRADEMARK OFFICE
CERTIFICATE OF CORRECTION

PATENT NO. : 4,781,075
DATED : November 1, 1988
INVENTOR(S) : Yamaji et al

It is certified that error appears in the above-identified patent and that said Letters Patent is hereby corrected as shown below:

Column 4, lines 40-47, please amend Claim 4 as follows:

The sintered camshaft of claim 1 wherein a rounded-off portion is provided at the point where the <u>outer periphery of the shaft meets the axial groove</u> [projection of the fitting member meets the inner periphery of the bore of the fitting member], said rounded-off portion having a larger radius of curvature than that where the <u>projection of the fitting member meets the inner periphery of the bore of the fitting member;</u> [outer periphery of the shaft meets the axial groove] thereby providing an enlarged space therebetween after sintering.

Signed and Sealed this

Thirteenth Day of April, 1993

Attest:

STEPHEN G. KUNIN

Attesting Officer

Acting Commissioner of Patents and Trademarks